United States Patent
Ryu et al.

(10) Patent No.: US 11,755,492 B2
(45) Date of Patent: Sep. 12, 2023

(54) STORAGE DEVICE AND OPERATING METHOD THEREOF

(71) Applicant: SK hynix Inc., Icheon-si (KR)

(72) Inventors: Jun Hee Ryu, Icheon-si (KR); Kwang Jin Ko, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/538,422

(22) Filed: Nov. 30, 2021

(65) Prior Publication Data

US 2022/0391323 A1 Dec. 8, 2022

(30) Foreign Application Priority Data

Jun. 8, 2021 (KR) .................. 10-2021-0074348

(51) Int. Cl.
*G06F 12/0882* (2016.01)
*G06F 13/16* (2006.01)
*G06F 12/0891* (2016.01)
*G06F 12/02* (2006.01)
*G06F 12/0897* (2016.01)

(52) U.S. Cl.
CPC ...... *G06F 12/0882* (2013.01); *G06F 12/0246* (2013.01); *G06F 12/0891* (2013.01); *G06F 12/0897* (2013.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 2004/0260517 A1* | 12/2004 | Ding | ..................... | G06F 8/4442 702/186 |
| 2014/0115235 A1* | 4/2014 | Ito | ..................... | G06F 12/0246 711/103 |
| 2014/0281249 A1* | 9/2014 | Waldspurger | ....... | G06F 12/0802 711/136 |
| 2016/0062916 A1* | 3/2016 | Das | ..................... | G06F 12/1027 711/133 |
| 2016/0232093 A1* | 8/2016 | Kim | ..................... | G06F 12/0862 |

FOREIGN PATENT DOCUMENTS

KR 20160098973 A 8/2016

* cited by examiner

*Primary Examiner* — Stephanie Wu
(74) *Attorney, Agent, or Firm* — Perkins Coie LLP

(57) ABSTRACT

A storage device is provided to comprise a memory device for storing data, a cache memory device including a first cache memory configured to cache certain data stored in the memory device and a second cache memory configured to store data evicted from the first cache memory, and a memory controller configured to receive a read request for first data from a host, evict second data from the first cache memory based on a reuse distance of the second data, store the second data in the second cache memory, load the first data to the first cache memory, and transmit the first data to the host.

20 Claims, 11 Drawing Sheets

STORAGE DEVICE AND OPERATING METHOD THEREOF

CROSS-REFERENCE TO RELATED APPLICATION

This patent document claims priority to and benefits of the Korean patent application number 10-2021-0074348, filed Jun. 8, 2021, which is incorporated herein by reference in its entirety.

TECHNICAL FIELD

The technology and implementations disclosed in this patent document generally relates to an electronic device, and more particularly, to a storage device and an operating method thereof.

BACKGROUND

Storage devices refer to electronic components that are configured to store data based on a control of a host device such as a computer or a smart phone. The storage device may include a memory device for storing data and a memory controller for controlling the memory device. The memory device is classified into a volatile memory device and a nonvolatile memory device depending on its capability to hold stored data in the absence of power.

A volatile memory device may store data only when power is supplied. Thus, such a volatile memory device loses its data in the absence of power. Examples of the volatile memory device may include a Static Random Access Memory (SRAM), a Dynamic Random Access Memory (DRAM).

A nonvolatile memory device is a memory device that can retain its data in the absence of power. Examples of the nonvolatile memory device may include a Read Only Memory (ROM), a Programmable ROM (PROM), an Electrically Programmable ROM (EPROM), an Electrically Erasable ROM (EEROM), or a flash memory.

SUMMARY

Embodiments of the disclosed technology provide a storage device for managing an improved multi-tier cache memory and an operating method of the storage device.

In one aspect, a storage device is provided to include: a memory device for storing data; a cache memory device including a first cache memory configured to cache certain data stored in the memory device and a second cache memory configured to store data evicted from the first cache memory; and a memory controller in communication with the memory device and the cache memory device and configured to control the memory device and the cache memory device, wherein the memory controller is configured to receive a read request for first data from a host, load the first data to the first cache memory, and control the cache memory device based on a reuse distance indicating a number of data elements accessed between any two accesses to a particular data element, and wherein the memory controller is further configured to control the first cache memory to move, to the second cache memory, second data having a largest reuse distance among the data cached in the first cache memory, and wherein a size of data corresponding to the reuse distance level of the second data is smaller than a total capacity of the cache memory device.

In another aspect, a storage device is provided to include: a memory device including a plurality of pages; a cache memory device including a first cache memory configured to cache data stored in the plurality of pages and a second cache memory configured to store data evicted from the first cache memory; and a memory controller configured to control the memory device and the cache memory device, wherein the memory controller is configured, in response to receiving a read request for read data from a host, to: load the read data to the first cache memory and control the first cache memory to transmit the read data from the first cache memory to the host; and determine whether to delete the read data from the cache memory device based on a comparison of a reuse distance of the read data with a total capacity of the cache memory device.

In another aspect, a method for operating a storage device including a first cache memory and a second cache memory is provided. The method includes: receiving a read request for first data from a host; evicting second data from the first cache memory based on a reuse distance of the second data; storing the second data in the second cache memory; loading the first data to the first cache memory; and transmitting the first data to the host.

BRIEF DESCRIPTION OF THE DRAWINGS

Example embodiments of the disclosed technology will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for describing examples of embodiments or implementations of the disclosed technology and should not be construed as limitations to the disclosed technology.

Figure 1:
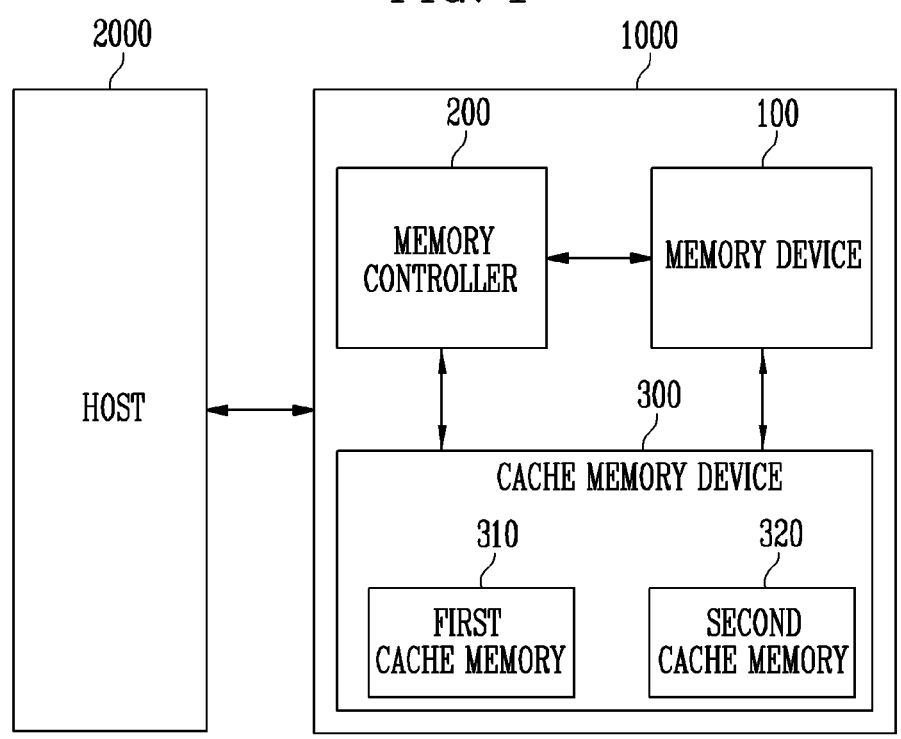
FIG. 1 is a block diagram illustrating a storage device in accordance with an embodiment of the disclosed technology.

FIG. 1 is a block diagram illustrating a storage device in accordance with an embodiment of the present disclosure.

Referring to FIG. 1, the storage device 1000 is a device for storing data and may include a memory device 100, a cache memory device 300 and a memory controller 200 that is coupled to control access by a host 2000 to cache memory device 300 and memory device 100 in response to control by the host 2000. The host 2000 may be various devices, such as a mobile phone, a smart phone, an MP3 player, a laptop computer, a desktop computer, a game console, a display device, a tablet PC or an in-vehicle infotainment. In various implementations, the memory device 100 may be referred to as a system memory with a larger memory capacity than that of the cache memory device 300 but may be operated at a lower speed than that of the cache memory device 300. The cache memory device 300 may be used to store a copy of certain instructions and data in the memory device 100 that is frequently used by the host 2000 for faster accessing and processing.

The storage device 1000 may be manufactured as any one of various types of storage devices according to a host interface that is a communication scheme with the host 2000. For example, the storage device 1000 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any one of various kinds of package types. For example, the storage device 1000 may be implemented as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data or use stored data. The memory device 100 operates based on the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells, and one memory block may include a plurality of pages. The page may be a unit for storing data in the memory device 100 or reading data stored in the memory device 100.

The memory device 100 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 may receive a command and an address from the memory controller 200. The memory device 100 may access an area selected by the received address in the memory cell array. That the memory device 100 accesses the selected area may mean that the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may mean an operation in which the memory device 100 reads data from the area selected by the address. The erase operation may mean an operation in which the memory device 100 erases data stored in the area selected by the address.

The memory controller 200 may control overall operations of the storage device 1000.

When power is applied to the storage device 1000, the memory controller 200 may execute firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells in which data included in the memory device 100 is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any request from the host 2000. For example, the memory controller 200 may control the memory device 100 to perform a program operation, a read operation, or an erase operation, which is used to perform a background operation such as wear leveling, garbage collection, or read reclaim.

The cache memory device 300 may include different cache memories, e.g., a first cache memory 310 and a second cache memory 320 as shown in FIG. 1. The cache memory device 300 may cache data stored in the memory device 100. Specifically, the cache memory device 300 may cache the data stored in the memory device 100 in the first cache memory 310 or the second cache memory 320 based on the control of the memory controller 200. The caching operation is performed to temporarily store frequently referred data in a memory that operates at a high speed so as to reduce the time required to access stored data. With the cache memory device 300, the storage device 1000 can reduce a number of times to access a memory (e.g., the memory device 100) operating at a lower speed as than that of the cache memory device.

The different cache memories included in the cache memory device 300 are configured as different levels of caches based on a cache hierarchy. The first cache memory 310 and the second cache memory 320, which are included in the cache memory device 300 may cache data stored in the memory device 100 based on the cache hierarchy so that the CPU's accessing to data stored in the memory device 100 can be reduced to improve the device performance. In some implementations, the first cache memory 310 may have a level higher than that of the second cache memory 320 based on the cache hierarchy. In some implementations, the first cache memory 310 with the higher level in the cache hierarchy may operate at a speed higher than that of the second cache memory 320. In an embodiment, the first cache memory 310 may operate at a first speed, and the second cache memory 320 may operate at a second speed lower than the first speed. In some implementations, the second cache memory 320 with the lower level in the cache hierarchy may cache data evicted or moved from the first cache memory 310 with the higher level in the cache hierarchy.

In some implementations, the first cache memory 310 with the higher level in the cache hierarchy may have a capacity smaller than that of the second cache memory 320 with the lower level in the cache hierarchy. Thus, the first cache memory 310 may be a memory which operates at a speed higher than that of the second cache memory 320 but has a capacity smaller than that of the second cache memory 320. In an embodiment, the first cache memory 310 and the second cache memory 320 may correspond to an exclusive cache in which any data shared by the first cache memory 310 and the second cache memory 320 does not exist. In an embodiment, the first cache memory 310 may be a Dynamic Random Access Memory (DRAM), and the second cache memory 320 may be a Storage Class Memory (SCM).

In an embodiment, since the cache memory device 300 is configured as a multi-tier memory including the first cache memory 310 and the second cache memory 320, hot data among cached data is stored in the first cache memory 310, and cold data among the cached data is stored in the second cache memory 320, which makes caching efficiency improved.

The host 2000 may communicate with the storage device 1000, using at least one of various communication techniques, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), or a Load Reduced DIMM (LRDIMM).

Figure 2:
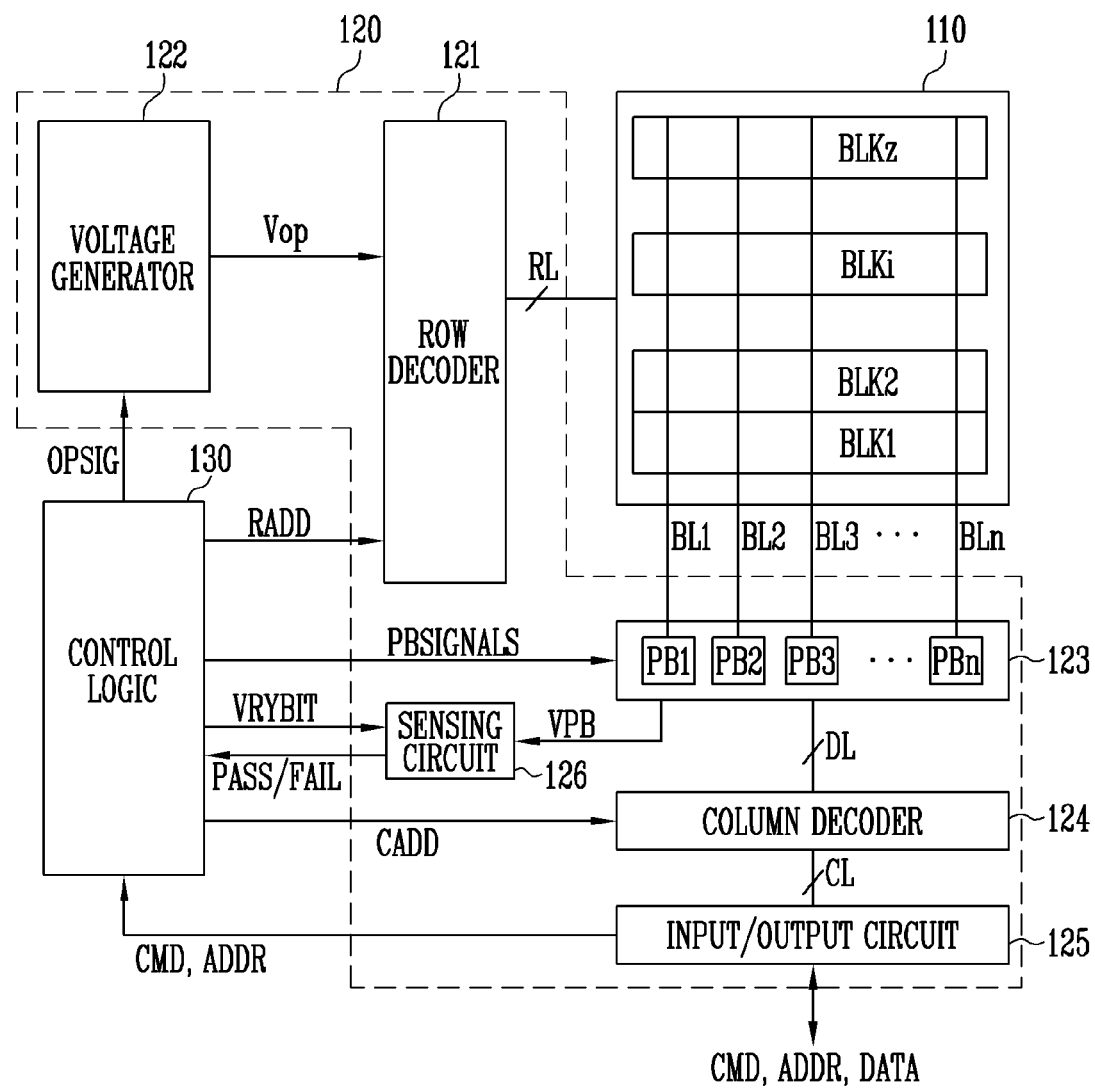
FIG. 2 is a block diagram illustrating a memory device in accordance with an embodiment of the disclosed technology.

FIG. 2 is a block diagram illustrating a memory device in accordance with an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The row lines RL may include at least one source select line, a plurality of word lines, and at least one drain select line. The plurality of memory blocks BLK1 to BLKz are connected to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells connected to the same word line may be defined as one page. Therefore, one memory block may include a plurality of pages.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may be configured to perform a program operation, a read operation or an erase operation on a selected area of the memory cell array 110 based on the control of the control logic 130. That is, the peripheral circuit 120 may drive the memory cell array 110 based on the control of the control logic 130. For example, the peripheral circuit 120 may apply various operating voltages to the row lines RL and the bit lines BL1 to BLn or discharge the applied voltages based on the control of the control logic 130.

In some implementations, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate based on the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage higher than the verify voltage to the unselected word lines. In a read operation, the row decoder 121 may apply a read voltage to the selected word line, and apply a read pass voltage higher than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a ground voltage to word lines connected to the selected memory block.

The voltage generator 122 may operate based on the control of the control logic 130. In some implementations, the voltage generator 122 may generate a plurality of voltages by using an external power voltage supplied to the memory device 100 based on the control of the control logic 130. For example, the voltage generator 122 may generate a program voltage, a verify voltage, a pass voltage, a read voltage, an erased voltage, or others based on the control of the control logic 130. Thus, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using the external power voltage or the internal power voltage. For example, the voltage generator 122 may include a plurality of pumping capacitors for receiving the internal power voltage, and generate the plurality of voltages by selectively activating the plurality of pumping capacitors based on the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through first to nth bit lines BL1 to BLn. Also, the first to nth bit lines BL1 to BLn may operate based on the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

In some implementations, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn.

In a read operation, the first to nth page buffers PB1 to PBn may read data DATA from the memory cells of the selected page through the first to nth bit lines BL1 to BLn, and outputs the read data DATA to the input/output circuit 125 based on the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit VRYBIT signal, and output a pass signal PASS or a fail signal FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. Also, the control logic 130 may determine whether the verify operation has passed or failed in response to the pass or fail signal PASS or FAIL. Also, the control logic 130 may control the page buffer group 123 to temporarily store verify information including the pass or fail signal PASS or FAIL in the page buffer group 123.

Figure 3:
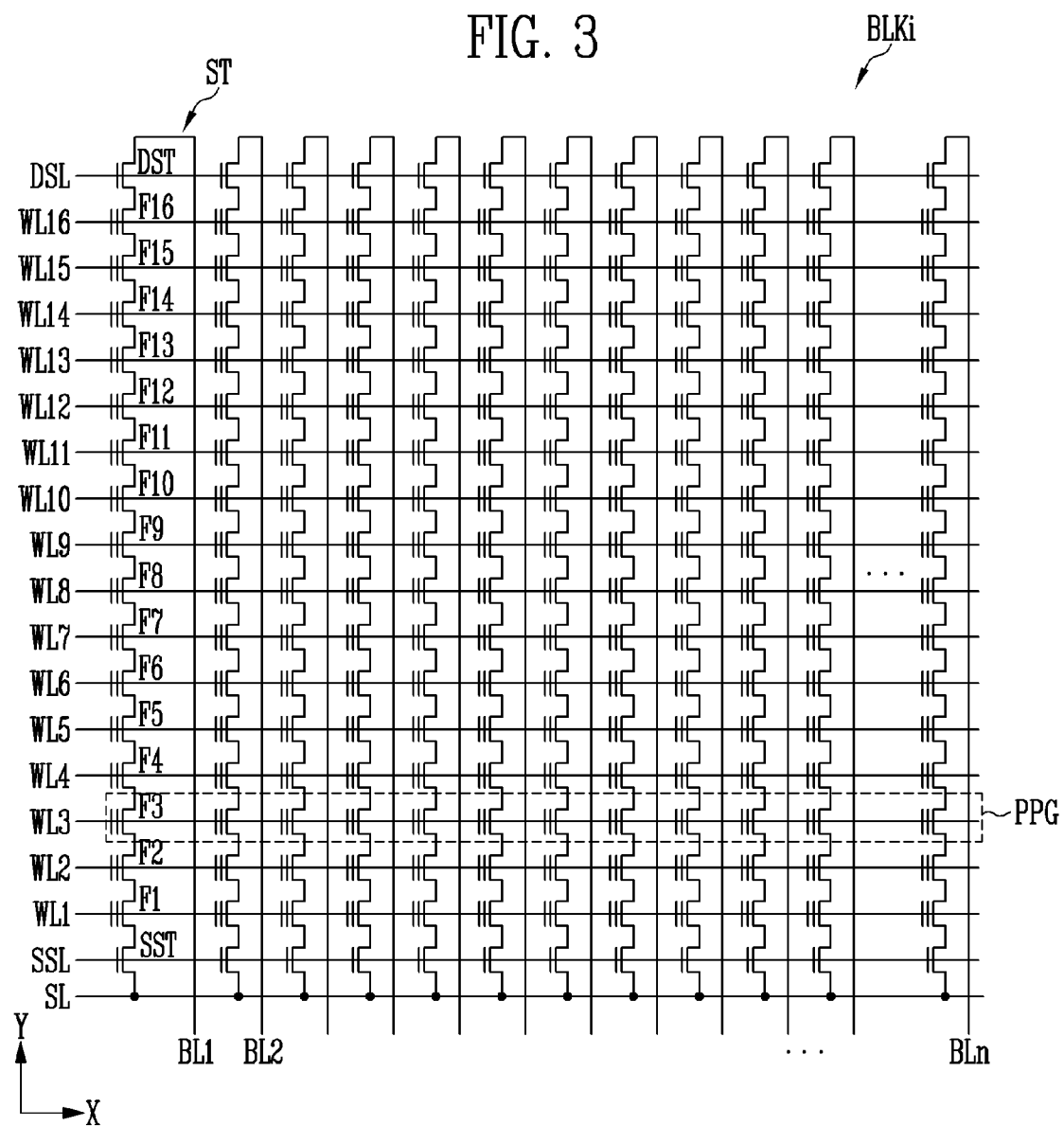
FIG. 3 is a diagram illustrating a memory block in accordance with an embodiment of the disclosed technology.

FIG. 3 is a diagram illustrating a memory block in accordance with an embodiment of the present disclosure.

Referring to FIG. 3, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells F1 to F16, and a drain select transistor DST, which are connected in series to each other between the source line SL and the first bit line BL1. At least one source select transistor SST and at least one drain select transistor DST may be included in one string ST, and memory cells of which number is greater than that of the memory cells F1 to F16 shown in the drawing may be included in the one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells F1 to F16 may be connected to a plurality of word lines WL1 to WL16.

A group of memory cells connected to the same word line among memory cells included in different strings ST may be referred to as a physical page PPG. Therefore, physical pages PPG of which the number corresponds to that of the word lines WL1 to WL16 may be included in the memory block BLKi.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The SLC may store one-bit data. One physical page PPG of the SLC may store one logical page (LPG) data. The one LPG data may include data bits of which number corresponds to that of cells included in the one physical page PPG.

The MLC, the TLC, and the QLC may store two or more-bit data. One physical page PPG may store two or more LPG data.

Figure 4:
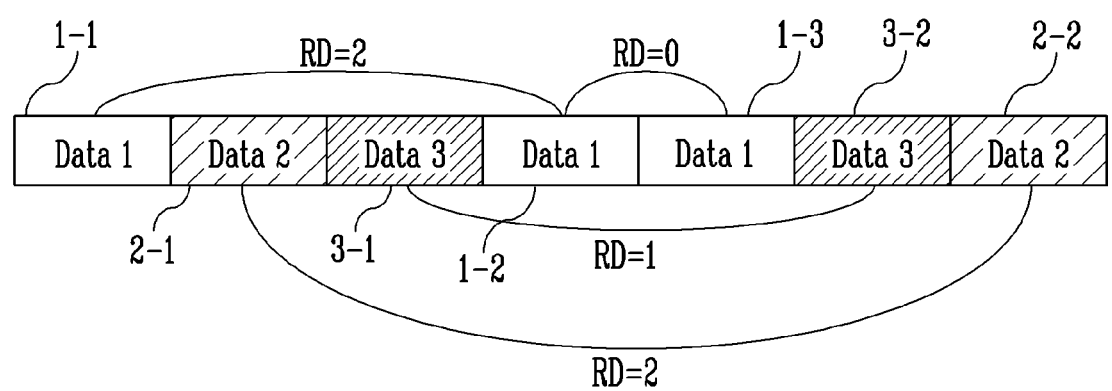
FIG. 4 is a diagram illustrating a reuse distance level in accordance with an embodiment of the disclosed technology.

FIG. 4 is a diagram illustrating a reuse distance level in accordance with an embodiment of the disclosed technology.

Referring to FIG. 4, the storage device 1000 may access first to third data according to a request of the host 2000. The storage device 1000 may repeatedly access specific data. When the storage device 1000 accesses specific data repeatedly, a physical or temporal distance between two different accesses of the specific data may be defined as a reuse distance RD. The reuse distance RD between a first access to a particular data and a second access to the particular data is determined by counting the number of data that the storage device 1000 accesses between the first and second accesses to the particular data. In counting the number of data, if the storage device 1000 accesses the same data repeatedly between the first and second accesses to the particular data, the number of data to access the same data is counted as one.

For example, as illustrated in FIG. 4, the storage device 1000 may access first data 1-1 according to a request of the host 2000 and then sequentially access second data 2-1, third data 3-1, first data 1-2, first data 1-3, third data 3-2, and second data 2-2. A reuse distance RD between two first data 1-1 and 1-2 is 2 since the storage device 1000 accesses two other data, the second data 2-1 and the third data 3-1, between accesses to the first data 1-1 and the first data 1-2. A reuse distance RD between two second data 2-1 and 2-2 is also 2 because the accessing to third data 3-1 and third data 3-2 is counted as one and accessing to first data 1-2 and first data 1-3 is counted as another one. The reuse distance RD is a concept for reusing cached data, and only kinds of data accessed until next specific data is accessed may be counted. That is, the same data accessed until specific data is again accessed may be counted as one. For example, a plurality of first data 1-2 and 1-3 are accessed between first third data 3-1 and second third data 3-2, but a reuse distance RD between the third data is 1 because accessing to first data 1-2 and first data 1-3 is counted as one.

Figure 5:
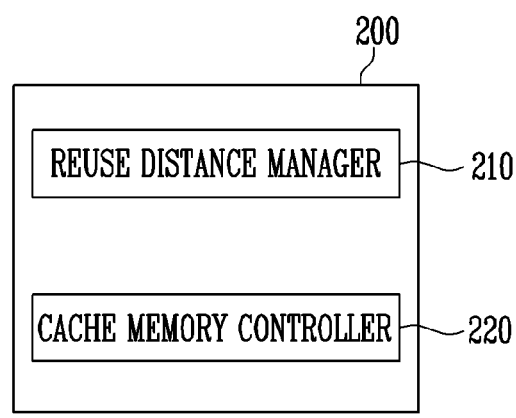
FIG. 5 is a diagram illustrating a configuration of a memory controller in accordance with an embodiment of the disclosed technology.

FIG. 5 is a diagram illustrating a configuration of a memory controller in accordance with an embodiment of the present disclosure.

Referring to FIG. 5, the memory controller 200 may include a reuse distance manager 210 and a cache memory controller 220.

The reuse distance manager 210 may be a component which determines a reuse distance level, based on access information on a plurality of pages included in the memory device 100. The access information may be information corresponding to a read request received from the host 2000. When the host 2000 requests specific data from the storage device 1000, the storage device 1000 may access the specific data, based on a logical address received from the host 2000. The storage device 1000 may store access information including a number of times each page is accessed, based on the read request received from the host 2000. Also, the reuse distance manager 210 may determine a reuse distance level of data stored in the memory device 100 and the cache memory device 300 by using the access information. The reuse distance manager 210 may use an algorithm for determining a reuse distance level with respect to each data, e.g., a least recently used (LRU), most recently used (MRU) algorithm.

The cache memory controller 220 may be a component which determines deletion or movement of data cached in the cache memory device 300. The cache memory controller 220 may determine deletion or movement of data cached in the cache memory device 300, based on the size of data corresponding to a reuse distance level of the cached data and a total capacity of the cache memory device 300. The total capacity of the cache memory device 300 may be a size obtained by adding up capacities of the first cache memory 310 and the second cache memory 320.

For example, when the size of data corresponding to a reuse distance level of a certain data cached in the cache memory device 300 is greater than the total capacity of the cache memory device 300, the cache memory controller 220 may control the cache memory device 300 to delete the certain data from the cache memory device 300. Thus, the cache memory controller 220 can efficiently manage the cache memory device 300 by deleting the certain data which has a high probability that a cache miss will occur.

The cache memory controller 220 may move data cached in the cache memory device 300 such that a reuse distance level of data cached in the first cache memory 310 is smaller than that of any data cached in the second cache memory 320. Thus, the cache memory controller 220 may control the cache memory device 300 to store hot data among the cached data in the first cache memory 310 and to store cold data among the cached data in the second cache memory 320.

Figure 6:
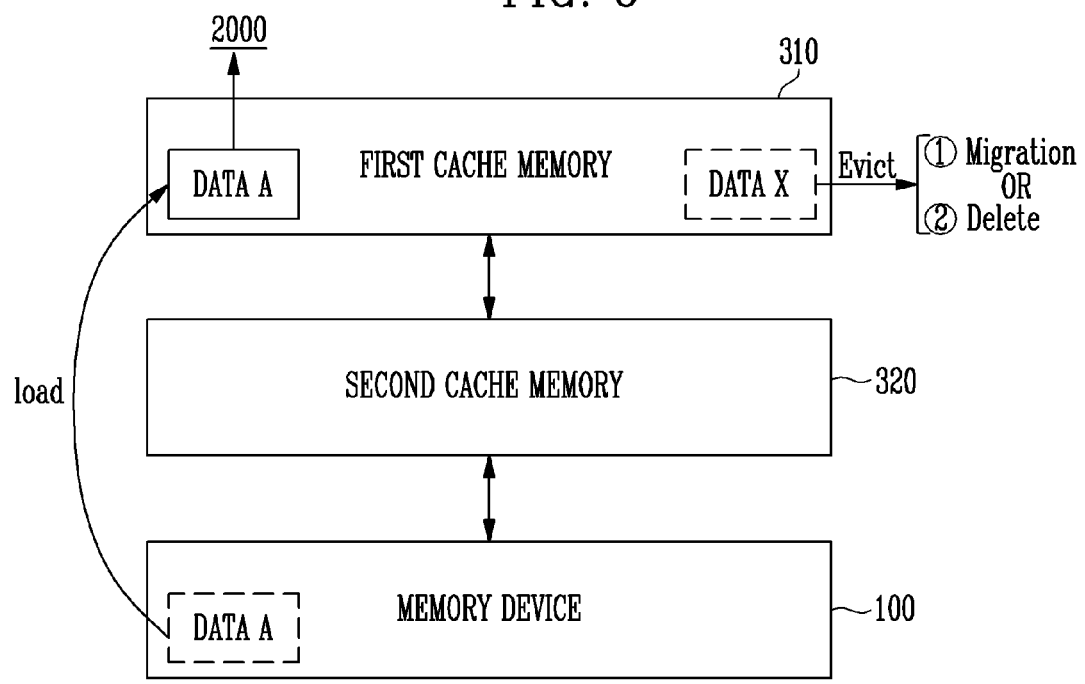
FIG. 6 is a diagram illustrating a caching method of data in accordance with an embodiment of the disclosed technology.

FIG. 6 is a diagram illustrating a caching method of data in accordance with an embodiment of the present disclosure.

Referring to FIG. 6, FIG. 6 is a diagram illustrating a case where the storage device 1000 receives a read request for 'data A' from the host 2000. When the storage device 1000 receives the read request for the 'data A' from the host 2000, the storage device 1000 may determine whether the 'data A' has been cached in the first cache memory 310 or the second cache memory 320. When it is determined that a cache miss has occurred, in which the 'data A' does not exist in the first cache memory 310 and the second cache memory 320, the storage device 1000 may load the 'data A' from the memory device 100 to the first cache memory 310. In some implementations, the storage device 1000 may transmit the 'data A' to the host 2000.

In some implementations, the storage device 1000 may secure a space in which the data A' is to be loaded in the first cache memory 310, before the 'data A' is loaded to the first cache memory 310. The storage device 1000 may migrate, to the second cache memory 320, 'data X' having a largest reuse distance level among data cached in the first cache memory 310, or delete the 'data X' from the cache memory device 300. In some implementations, when a size of data corresponding to the reuse distance level of the 'data X' is greater than the sum of the capacities of the first cache memory 310 and the second cache memory 320, the storage device 1000 may delete the 'data X' from the cache memory device 300. In some implementations, when the size of data corresponding to the reuse distance level of the 'data X' is smaller than the sum of the capacities of the first cache memory 310 and the second cache memory 320, the storage device 1000 may migrate the 'data X' from the first cache memory 310 to the second cache memory 320. The size of the data corresponding to the reuse distance level of the 'data X' may refer to a size of data accessed between two accesses to the 'data X.'

Figure 7:
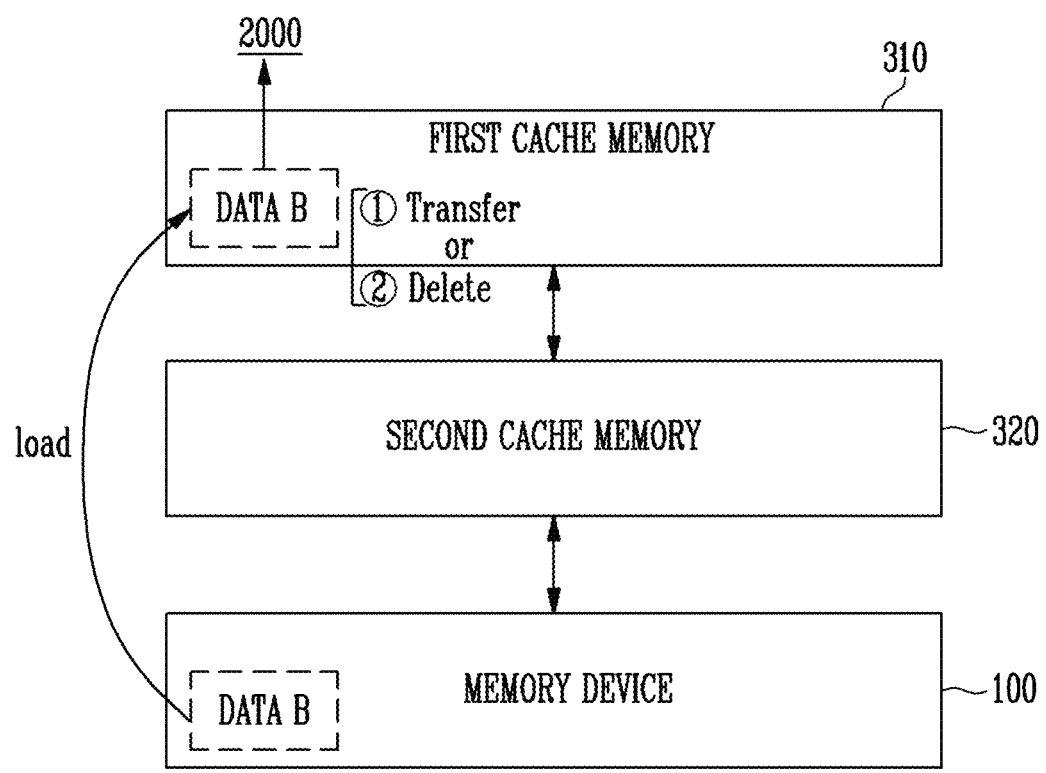
FIG. 7 is a diagram illustrating a caching method of data in accordance with an embodiment of the disclosed technology.

FIG. 7 is a diagram illustrating a caching method of data in accordance with an embodiment of the present disclosure.

Referring to FIG. 7, FIG. 7 is a diagram illustrating a case where the storage device 1000 receives a read request for 'data B' from the host 2000. When the storage device 1000 receives the read request for the 'data B' from the host 2000, the storage device 1000 may determine whether the 'data B' has been cached in the first cache memory 310 or the second cache memory 320. When it is determined that a cache miss has occurred, in which the 'data B' does not exist in the first cache memory 310 and the second cache memory 320, the storage device 1000 may load the 'data B' from the memory device 100 to the first cache memory 310. In some implementations, the storage device 1000 may transmit the 'data B' to the host 2000.

In some implementations, the storage device 1000 may determine whether it is appropriate that the 'data B' is cached in the first cache memory 310. In some implementations, the storage device 1000 may determine whether the 'data B' is to be deleted, based on a size of data corresponding to a reuse distance level of the 'data B.' For example, when the size of the data corresponding to the reuse distance level of the 'data B' is greater than that obtained by adding up the capacities of the first cache memory 310 and the second cache memory 320, the storage device 1000 may delete the 'data B' from the cache memory device 300. In some implementations, when the size of the data corresponding to the reuse distance level of the 'data B' is largest among data cached in the first cache memory 310 or when the size of the data corresponding to the reuse distance level of the 'data B' is greater than a reuse distance level of any data cached in the second cache memory 320, the storage device 1000 may migrate the 'data B' from the first cache memory 310 to the second cache memory 320. The size of the data corresponding to the reuse distance level of the 'data B' may refer to a size of data accessed between two accesses to the 'data B.'

Figure 8:
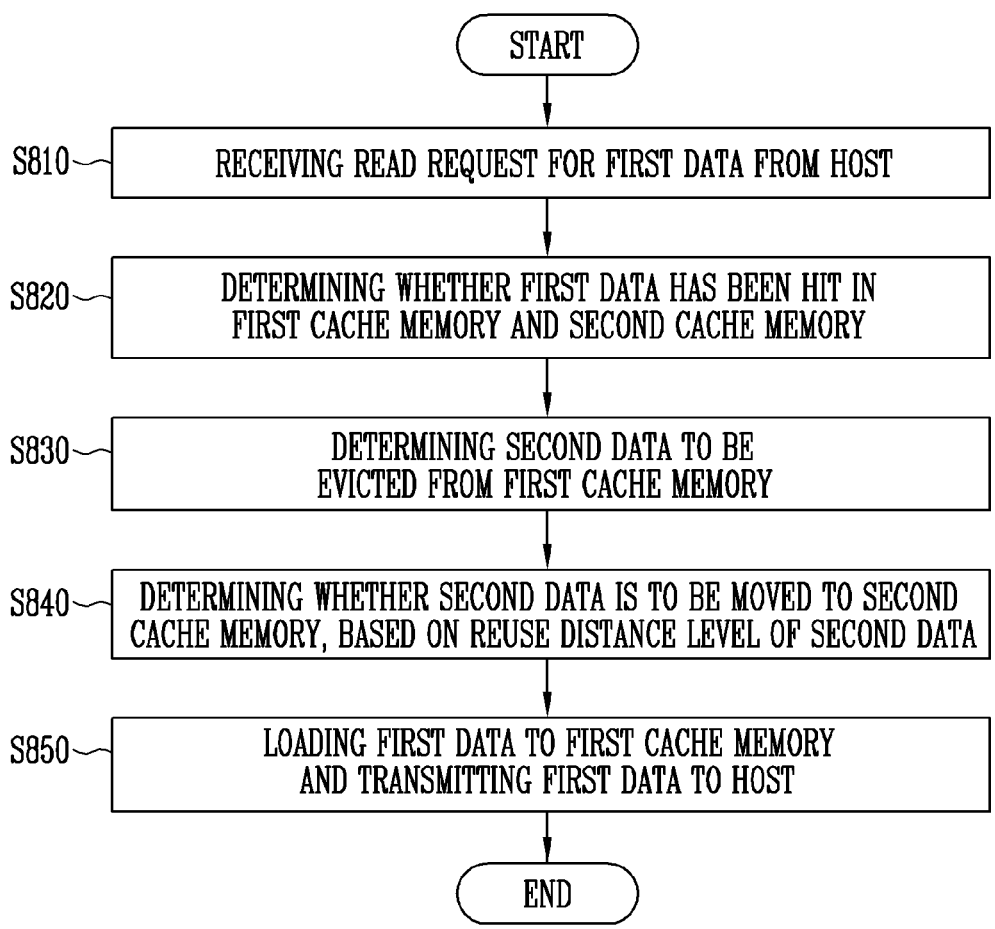
FIG. 8 is a diagram illustrating an operating method of the storage device in accordance with an embodiment of the disclosed technology.

FIG. 8 is a diagram illustrating an operating method of the storage device in accordance with an embodiment of the present disclosure.

Referring to FIG. 8, the storage device 1000 may receive a read request for first data from the host 2000 (S810). The storage device 1000 may determine whether the first data has been hit in the first cache memory 310 or the second cache memory 320, in response to the read request received from the host 2000 (S820). The hitting is cache hitting, and may be an operation of determining whether data corresponding to the read request exists in the cache memory device 300.

When the first data is not hit in the first cache memory 310 and the second cache memory 320, the storage device 1000 may determine second data to be evicted from the first cache memory 310, based on a reuse distance level of data cached in the first cache memory 310 (S830). The storage device 1000 may determine the second data to be moved to the second cache memory 320 so as to secure a space for loading the first data to the first cache memory 310 (S840). In some implementations, the storage device 1000 may determine whether the second data is to be moved to the second cache memory 320, based on a reuse distance level of the second data. In some implementations, the storage device 1000 may move, to the second cache memory 320, the second data having a largest reuse distance level among the data cached in the first cache memory 310. The reuse distance level of the second data may be smaller than that of any data cached in the second cache memory 320, and a size of data corresponding to the reuse distance level of the second data may be smaller than a sum of capacities of the first cache memory 310 and the second cache memory 320.

The storage device 1000 may load the first data to the first cache memory 310, and transmit the loaded first data to the host 2000 (S850).

Figure 9:
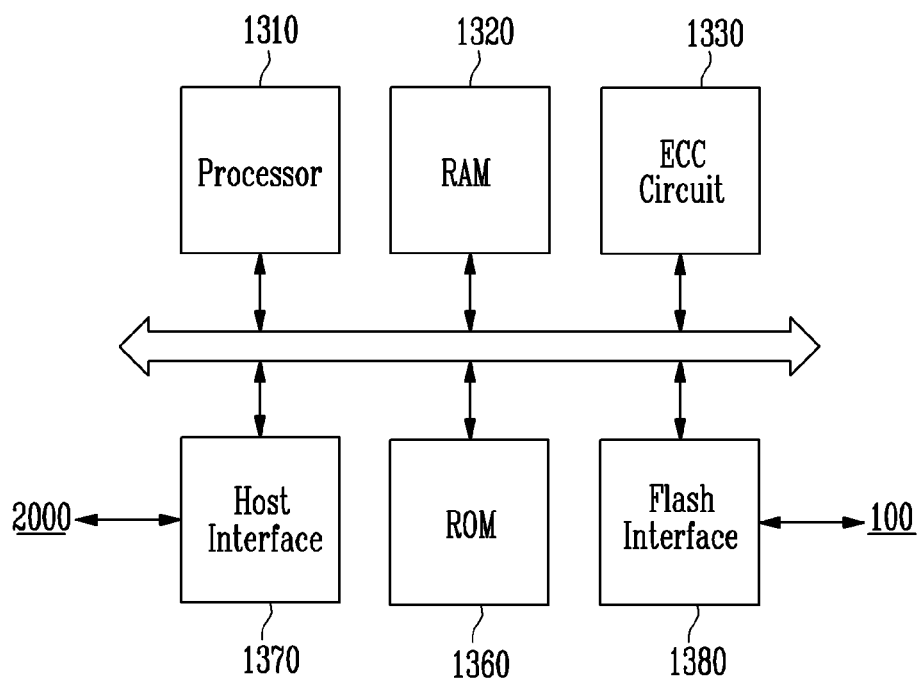
FIG. 9 is a diagram illustrating a memory controller in accordance with another embodiment of the disclosed technology.

FIG. 9 is a diagram illustrating a memory controller in accordance with another embodiment of the present disclosure.

Referring to FIG. 9, the memory controller 1300 may include a processor 1310, a RAM 1320, and an ECC circuit 1330, a ROM 1360, a host interface 1370, and a flash interface 1380. The memory controller 1300 shown in FIG. 9 may be an embodiment of the memory controller 200 shown in FIG. 1.

The processor 1310 may communicate with the host 2000 by using the host interface 1370, and perform a logical operation to control an operation of the memory controller 1300. For example, the processor 1310 may load a program command, a data file, a data structure, etc., based on a request received from the host 2000 or an external device, and perform various operations or generate a command and an address. For example, the processor 1310 may generate various commands necessary for a program operation, a read operation, an erase operation, a suspend operation, and a parameter setting operation.

Also, the processor 1310 may perform a function of a Flash Translation Layer (FTL). The processor 1310 may translate a Logical Block Address (LBA) provided by the host 2000 into a Physical Block Address (PBA) through the FTL. The FTL may receive an LBA input by using a mapping table, to translate the LBA into a PBA. Several address mapping methods of the FTL exist according to mapping units. A representative address mapping method includes a page mapping method, a block mapping method, and a hybrid mapping method.

Also, the processor 1310 may generate a command without any request from the host 2000. For example, the processor 1310 may generate a command for background operations such as operations for wear leveling of the memory device 100 and operations for garbage collection of the memory device 100.

The RAM 1320 may be used as a buffer memory, a working memory, or a cache memory of the processor 1310. Also, the RAM 1320 may store codes and commands, which the processor 1310 executes. The RAM 1320 may store data processed by the processor 1310. Also, the RAM 1320 may be implemented, including a Static RAM (SRAM) or a Dynamic RAM (DRAM).

The ECC circuit 1330 may detect an error in a program operation or a read operation, and correct the detected error. Specifically, the ECC circuit 1330 may perform an error correction operation according to an Error Correction Code. Also, the ECC circuit 1330 may perform ECC encoding, based on data to be written to the memory device 100. The data on which the ECC encoding is performed may be transferred to the memory device 100 through the flash interface 1380. Also, the ECC circuit 1330 may perform ECC decoding on data received from the memory device 100 through the flash interface 1380.

The ROM 1360 may be used as a storage unit for storing various information necessary for an operation of the memory controller 1300. Specifically, the ROM 1360 may include a map table, and physical-to-logical address information and logical-to-physical address information may be stored in the map table. Also, the ROM 1360 may be controlled by the processor 1310.

The host interface 1370 may include a protocol for exchanging data between the host 2000 and the memory controller 1300. Specifically, the host interface 1370 may communicate with the host 2000 through at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The flash interface 1380 may communicate with the memory device 100 by using a communication protocol based on the control of the processor 1310. Specifically, the flash interface 1380 may communicate a command, an address, and data with the memory device 100 through a channel. For example, the flash interface 1380 may include a NAND interface.

Figure 10:
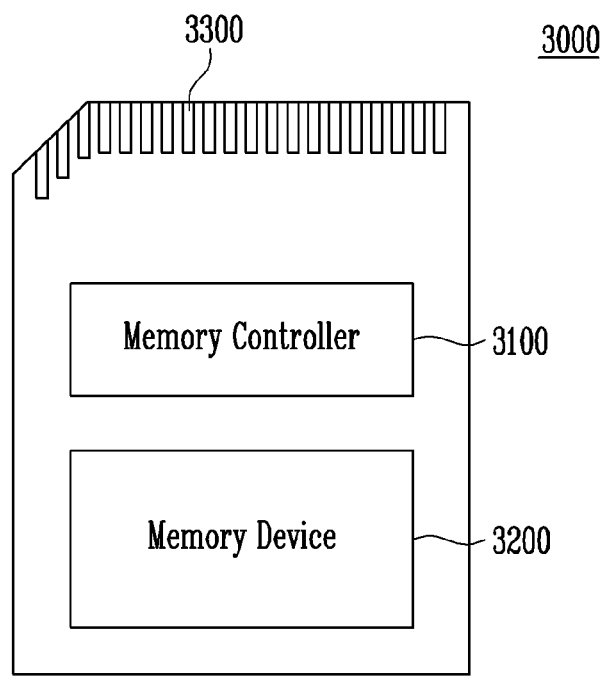
FIG. 10 is a diagram illustrating a memory card system in accordance with an embodiment of the disclosed technology.

FIG. 10 is a diagram illustrating a memory card system in accordance with an embodiment of the present disclosure.

Referring to FIG. 10, the memory card system 3000 includes a memory controller 3100, a memory device 3200, and a connector 3300.

The memory controller 3100 may be connected to the memory device 3200. The memory controller 3100 may access the memory device 3200. For example, the memory controller 3100 may control read, write, erase, and background operations on the memory device 3200. The memory controller 3100 may provide an interface between the memory device 3200 and a host. Also, the memory controller 3100 may drive firmware for controlling the memory device 3200.

For example, the memory controller 3100 may include components such as a Random Access Memory (RAM), a processing unit, a host interface, a memory interface, and the error corrector.

The memory controller 3100 may communicate with an external device through the connector 3300. The memory controller 3100 may communicate with the external device (e.g., the host) according to a specific communication protocol. Exemplarily, the memory controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

Exemplarily, the memory device 3200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 3100 and the memory device 3200 may be integrated into a single semiconductor device, to constitute a memory card. For example, the memory controller 3100 and the memory device 3200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 11:
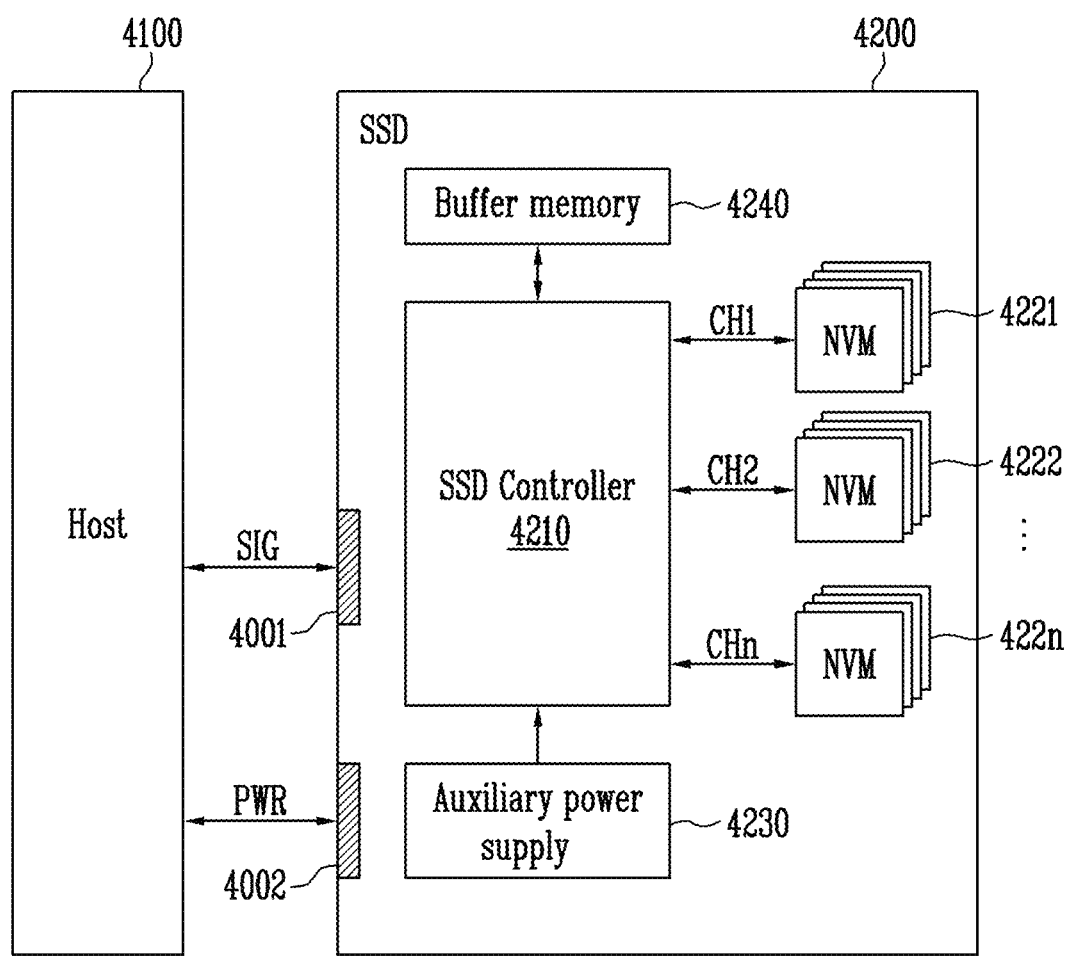
FIG. 11 is a diagram illustrating a Solid State Drive (SSD) system in accordance with an embodiment of the disclosed technology.

FIG. 11 is a diagram illustrating a Solid State Drive (SSD) in accordance with an embodiment of the present disclosure.

Referring to FIG. 11, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories 4221 to 422n, an auxiliary power supply 4230, and a buffer memory 4240.

In an embodiment, the SSD controller 4210 may serve as the memory controller 200 described with reference to FIG. 1. The SSD controller 4210 may control the plurality of flash memories 4221 to 422n in response to a signal SIG received from the host 4100. Exemplarily, the signal SIG may be a signal based on an interface between the host 4100 and the SSD 4200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 4230 may be connected to the host 4100 through the power connector 4002. The auxiliary power supply 4230 may receive power PWR input from the host 4100 and be charged with the power PWR. When the supply of power from the host 4100 is not smooth, the auxiliary power supply 4230 may provide power of the SSD 4200. Exemplarily, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422n, or temporarily store meta data (e.g., a mapping table) of the flash memories 4221 to 422n. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 12:
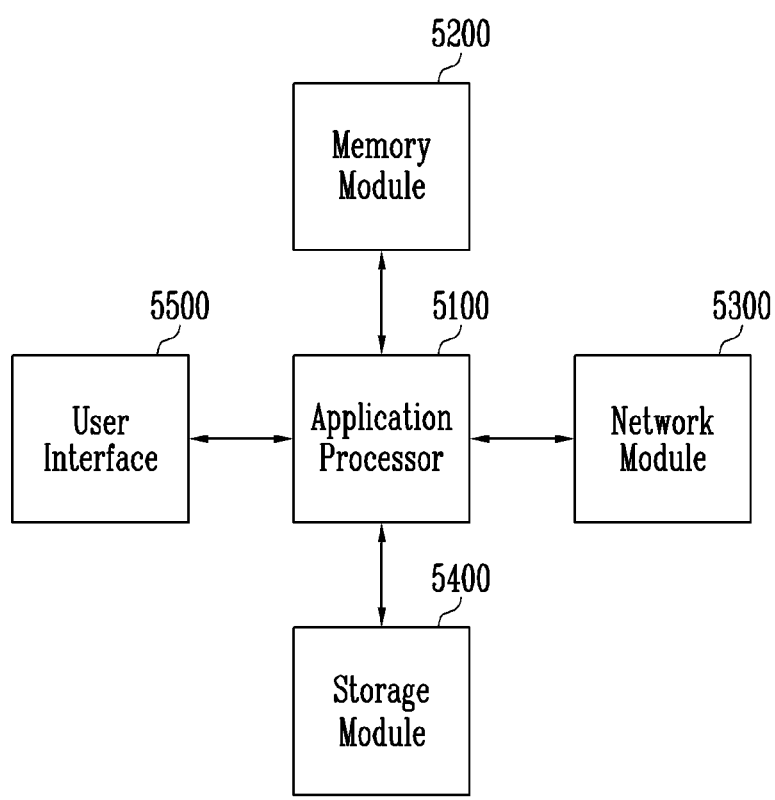
FIG. 12 is a diagram illustrating a user system in accordance with an embodiment of the disclosed technology.

FIG. 12 is a diagram illustrating a user system in accordance with an embodiment of the present disclosure.

Referring to FIG. 12, the user system 5000 includes an application processor 5100, a memory module 5200, a network module 5300, a storage module 5400, and a user interface 5500.

The application processor 5100 may drive components included in the user system 5000, an operating system (OS), a user program, or the like. Exemplarily, the application processor 5100 may include controllers for controlling components included in the user system 5000, interfaces, a graphic engine, and the like. The application processor 5100 may be provided as a System-on-Chip (SoC).

The memory module 5200 may operate as a main memory, working memory, buffer memory or cache memory of the user system 5000. The memory module 5200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. Exemplarily, the application processor 5100 and the memory module 5200 may be provided as one semiconductor package by being packaged based on a Package on Package (PoP).

The network module 5300 may communicate with external devices. Exemplarily, the network module 5300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. Exemplarily, the network module 5300 may be included in the application processor 5100.

The storage module 5400 may store data. For example, the storage module 5400 may store data received from the application processor 5100. Alternatively, the storage module 5400 may transmit data stored therein to the application processor 5100. Exemplarily, the storage module 5400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 5400 may be provided as a removable drive such as a memory card of the user system 5000 or an external drive.

Exemplarily, the storage module 5400 may include a plurality of nonvolatile memory devices, and the plurality of nonvolatile memory devices may operate identically to the memory device 100 described with reference to FIGS. 1 to 3. The storage module 4400 may operate identically to the storage device 1000 described with reference to FIG. 1.

The user interface 5500 may include interfaces for inputting data or commands to the application processor 5100 or outputting data to an external device. Exemplarily, the user interface 5500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with some implementations of the disclosed technology, there can be provided a storage device for managing an improved multi-tier cache memory and an operating method of the storage device.

While the disclosed technology has been shown and described with reference to certain exemplary embodiments thereof, it will be understood by those skilled in the art that various changes may be made. The embodiments disclosed in this patent document are only examples to facilitate an understanding of the disclosed technology, and the disclosed technology is not limited thereto. Various modifications and enhancements of the disclosed embodiments and other embodiments can be made based on what is disclosed in this patent document.

What is claimed is:

1. A storage device comprising:
   a memory device for storing data;
   a cache memory device including a first cache memory configured to cache certain data stored in the memory device and a second cache memory configured to store data evicted from the first cache memory; and
   a memory controller in communication with the memory device and the cache memory device and configured to control the memory device and the cache memory device,
   wherein the memory controller is configured to:
   provide control for loading first data to the first cache memory;
   calculate a reuse distance of the first data indicating a number of data elements accessed between two accesses to the first data;
   calculate a size of data corresponding to a reuse distance level of second data having a largest reuse distance; and
   provide control for moving the second data to the second cache memory based on the size of data corresponding to the reuse distance level of the second data,
   wherein the size of data corresponding to the reuse distance level of the second data is a size of data accessed between two accesses to the second data, and
   wherein the size of data corresponding to the reuse distance level of the second data is smaller than a total capacity of the cache memory device.

2. The storage device of claim 1, wherein the memory controller is configured to control the cache memory device to delete, from the cache memory device, third data,
   wherein a size of data corresponding to a reuse distance level of the third data is a size of data accessed between two accesses to the third data, and
   wherein the size of data corresponding to the reuse distance level of the third data is greater than the total capacity of the cache memory device.

3. The storage device of claim 2, wherein the memory controller is configured to transmit the first data to a host and control the cache memory device to delete the first data from the cache memory device,
   wherein a size of data corresponding to a reuse distance level of the first data is a size of data accessed between two accesses to the first data, and
   wherein the size of data corresponding to the reuse distance level of the first data is greater than the total capacity of the cache memory device.

4. The storage device of claim 1, wherein the memory controller is configured to move data cached in the cache memory device such that a reuse distance of the data cached in the first cache memory is smaller than that of any data cached in the second cache memory.

5. The storage device of claim 1, wherein the first cache memory and the second cache memory correspond to an exclusive cache in which any data shared by the first cache memory and the second cache memory does not exist.

6. The storage device of claim 1, wherein the first cache memory and the second cache memory are configured to operate at a first speed and a second speed lower than the first speed, respectively.

7. The storage device of claim 1, wherein a capacity of the first cache memory is smaller than that of the second cache memory.

8. The storage device of claim 1, wherein the first cache memory is a Dynamic Random Access Memory (DRAM), and the second cache memory is a Storage Class Memory (SCM).

9. The storage device of claim 1, wherein the memory controller includes:
- a reuse distance manager configured to determine a reuse distance of data, based on access information stored in the memory device; and
- a cache memory controller configured to determine whether data cached in the cache memory device is to be deleted or moved, based on the reuse distance and the total capacity of the cache memory device.

10. A storage device comprising:
- a memory device including a plurality of pages;
- a cache memory device including a first cache memory configured to cache data stored in the plurality of pages and a second cache memory configured to store data evicted from the first cache memory; and
- a memory controller configured to control the memory device and the cache memory device,
- wherein the memory controller is configured, in response to receiving a read request for read data from a host, to:
- load the read data to the first cache memory and control the first cache memory to transmit the read data from the first cache memory to the host;
- calculate a reuse distance of the read data indicating a number of data elements accessed between any two accesses to the read data;
- calculate a size of data corresponding to a reuse distance level of data having a largest reuse distance of the read data; and
- determine whether to delete the read data from the cache memory device based on a comparison of a size of data corresponding to a reuse distance of the read data with a total capacity of the cache memory device,
- wherein the size of data corresponding to the reuse distance of the read data is a size of data accessed between two accesses to the read data.

11. The storage device of claim 10, wherein the memory controller is configured to control the cache memory device to delete, from the cache memory device, certain data,
- wherein a size of data corresponding to a reuse distance of the certain data is a size of data accessed between two accesses to the certain data, and
- wherein the size of data corresponding to the reuse distance of the certain data is greater than the total capacity of the cache memory device.

12. The storage device of claim 11, wherein the memory controller is configured to transmit the read data to the host and control the cache memory device to delete the read data from the cache memory device, and
- wherein the size of data corresponding to the reuse distance of the read data is greater than the total capacity of the cache memory device.

13. The storage device of claim 10, wherein the memory controller is configured to move data cached in the cache memory device such that a reuse distance of the data cached in the first cache memory is smaller than that of any data cached in the second cache memory.

14. The storage device of claim 10, wherein the first cache memory and the second cache memory correspond to an exclusive cache in which any data shared by the first cache memory and the second cache memory does not exist.

15. The storage device of claim 10, wherein the first cache memory and the second cache memory are configured to operate at a first speed and a second speed lower than the first speed, respectively.

16. The storage device of claim 10, wherein a capacity of the first cache memory is smaller than that of the second cache memory.

17. The storage device of claim 10, wherein the memory controller includes:
- a reuse distance manager configured to determine a reuse distance of data corresponding to each page, based on access information on each of the plurality of pages; and
- a cache memory controller configured to determine whether data cached in the cache memory device is to be deleted or moved, based on the reuse distance and the total capacity of the cache memory device.

18. A method for operating a storage device including a first cache memory, a second cache memory and a main memory, the method comprising:
- receiving a read request for first data from a host;
- calculating a reuse distance of the first data indicating a number of data elements accessed between any two accesses to the first data;
- calculating a size of data corresponding to a reuse distance of second data having the largest reuse distance of the first data;
- evicting second data from the first cache memory based on the size of data corresponding to the reuse distance of the second data;
- storing the second data in the second cache memory;
- loading the first data to the first cache memory; and
- transmitting the first data to the host,
- wherein the size of data corresponding to the reuse distance of the second data is a size of data accessed between two accesses to the second data.

19. The method of claim 18, wherein the second data has a largest reuse distance level among the data cached in the first cache memory.

20. The method of claim 19, further comprising:
- evicting the second data from the second cache memory based on whether the size of data corresponding to the reuse distance of the second data is greater than a sum of capacities of the first cache memory and the second cache memory.

* * * * *